(12) United States Patent
On et al.

(10) Patent No.: US 10,977,007 B2
(45) Date of Patent: Apr. 13, 2021

(54) APPARATUS AND METHOD FOR EXECUTING FUNCTION

(71) Applicant: ELECTRONICS AND TELECOMMUNICATIONS RESEARCH INSTITUTE, Daejeon (KR)

(72) Inventors: Jin-Ho On, Sejong-si (KR); Young-Ho Kim, Daejeon (KR); Chei-Yol Kim, Sejong-si (KR); Su-Min Jang, Sejong-si (KR); Gyu-Il Cha, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/575,904

(22) Filed: Sep. 19, 2019

(65) Prior Publication Data

US 2020/0183657 A1    Jun. 11, 2020

(30) Foreign Application Priority Data

Dec. 5, 2018  (KR) .......................... 0-2018-0155409
Jul. 2, 2019  (KR) ........................ 10-2019-0079638

(51) Int. Cl.
| G06F 9/44 | (2018.01) |
| G06F 8/30 | (2018.01) |
| G06F 9/54 | (2006.01) |
| G06F 8/41 | (2018.01) |
| G06F 8/36 | (2018.01) |

(52) U.S. Cl.
CPC ............... *G06F 8/311* (2013.01); *G06F 8/36* (2013.01); *G06F 8/41* (2013.01); *G06F 9/547* (2013.01)

(58) Field of Classification Search
CPC ...................................................... G06F 8/311
USPC ......................................................... 717/106
See application file for complete search history.

(56) References Cited

U.S. PATENT DOCUMENTS

| 8,600,140 | B2 | 12/2013 | Jeon et al. |
| 9,058,177 | B2* | 6/2015 | Chiluvuri ................. G06F 8/20 |
| 9,940,216 | B2* | 4/2018 | Frenkiel ............. G06F 11/3664 |
| 2011/0311060 | A1 | 12/2011 | Kim et al. |
| 2014/0337816 | A1* | 11/2014 | Chiluvuri ................. G06F 8/36 717/107 |
| 2016/0364221 | A1* | 12/2016 | Eguchi ...................... G06F 8/22 |
| 2018/0173502 | A1 | 6/2018 | Biskup et al. |
| 2018/0300173 | A1 | 10/2018 | Shimamura et al. |
| 2018/0375712 | A1 | 12/2018 | Krohling et al. |
| 2020/0076672 | A1* | 3/2020 | Bodner ................... G06F 9/547 |

* cited by examiner

*Primary Examiner* — Evral E Bodden
(74) *Attorney, Agent, or Firm* — LRK Patent Law Firm (57) ABSTRACT

An apparatus and method for executing a function. The apparatus includes one or more processors and executable memory for storing at least one program executed by the one or more processors, and the at least one program is configured to determine whether it is possible to reengineer a user function source using interface description language (IDL) code, to generate a reengineered function source by reengineering the user function source, and to execute the reengineered function source.

14 Claims, 11 Drawing Sheets

APPARATUS AND METHOD FOR EXECUTING FUNCTION

CROSS REFERENCE TO RELATED APPLICATIONS

This application claims the benefit of Korean Patent Application No. 10-2018-0155409, filed Dec. 5, 2018, and No. 10-2019-0079638, filed Jul. 2, 2019, which are hereby incorporated by reference in their entireties into this application.

BACKGROUND OF THE INVENTION

1. Technical Field

The present invention relates generally to technology for providing a distributed network service, and more particularly to technology for executing a function in a distributed network.

2. Description of Related Art

Currently, network-based distributed systems have a large number of users and have a huge amount of traffic to process during a certain time. Conventional monolithic architecture systems are not adequate for handling the current requirements of users and have limitations in traffic handling and in the development, deployment, and management of applications.

In order to solve these problems, many large-scale IT systems break down a function into services and deploy the services across multiple hardware devices in a distributed manner, but this approach does not completely solve all problems due to the large scale of services.

In order to overcome the limitations of monolithic architecture, providers that provide their services around the world using large-scale systems, such as Netflix, Uber, and the like, are migrating their systems to environments based on microservices and serverless architecture, such as Amazon's Lambda, Google's Functions, Microsoft's Azure Functions, or the like.

In such an environment, each function has a very small size, for example, about 100 lines. However, because many functions are executed in connection with each other in order to perform a single task, it is very important to quickly execute each function in response to a request to execute the function.

Meanwhile, U.S. Patent Application Publication No. 2018/0300173, titled "Serverless computing and task scheduling", discloses a method for defining a task, receiving a task, performing a task by chaining the same to a previous task, registering a task in a task queue, and removing a task from the task queue and executing the same when it is necessary to perform multiple tasks in a serverless computing environment.

SUMMARY OF THE INVENTION

An object of the present invention is to quickly provide a service by optimizing a user function in a service platform.

Another object of the present invention is to efficiently reduce a delay in function execution, which is a problem with an existing function executor.

In order to accomplish the above objects, an apparatus for executing a function according to an embodiment of the present invention includes one or more processors and executable memory for storing at least one program executed by the one or more processors, and the at least one program may determine whether a user function source is capable of being reengineered using Interface Description Language (IDL) code, generate a reengineered function source by reengineering the user function source, and execute the reengineered function source.

Here, the at least one program may check the IDL code of the user function source and determine that the user function source is capable of being reengineered when previously stored IDL code corresponding to the IDL code of the user function source is present.

Here, the at least one program may determine whether stub code is present in the IDL code of the user function source and generate stub code using a compiler corresponding to the IDL code of the user function source when it is determined that the stub code is not present.

Here, the at least one program may break down the user function source into reusable code, non-reusable code, and release code.

Here, the at least one program may change the user function source into the reengineered function source including a remote procedure call (RPC) server code block, a context source block, a preloading block, and a release code block.

Here, the at least one program may register RPC server code and context code in the RPC server code block and the context source block, respectively, in a form corresponding to the IDL code of the stub code.

Here, the at least one program may register the reusable code in the preloading block in a form corresponding to the IDL code of the stub code.

Here, the at least one program may change the non-reusable code into a form of the RPC server code and register the changed non-reusable code in the RPC server code block.

Here, the at least one program may execute the reengineered function source and execute RPC client code corresponding to the RPC server code, thereby changing the state of the apparatus to a state capable of responding to a request to execute a function.

Here, the at least one program may check the IDL code of the user function source, register a general-purpose function execution engine when previously stored IDL code corresponding to the IDL code of the user function source is not present, and execute a function, execution of which is requested by a user, using the general-purpose function execution engine.

Also, in order to accomplish the above objects, a method for executing a function, performed by an apparatus for executing the function, according to an embodiment of the present invention includes determining whether a user function source is capable of being reengineered using Interface Description Language (IDL) code; generating a reengineered function source by reengineering the user function source; and executing the reengineered function source.

Here, determining whether the user function source is capable of being reengineered may be configured to check the IDL code of the user function source and to determine that the user function source is capable of being reengineered when previously stored IDL code corresponding to the IDL code of the user function source is present.

Here, determining whether the user function source is capable of being reengineered may be configured to determine whether stub code is present in the IDL code of the user function source and to generate stub code using a compiler corresponding to the IDL code of the user function source when it is determined that the stub code is not present.

Here, generating the reengineered function source may be configured to break down the user function source into reusable code, non-reusable code, and release code.

Here, generating the reengineered function source may be configured to change the user function source into the reengineered function source including a remote procedure call (RPC) server code block, a context source block, a preloading block, and a release code block.

Here, generating the reengineered function source may be configured to register RPC server code and context code in the RPC server code block and the context source block, respectively, in a form corresponding to the IDL code of the stub code.

Here, generating the reengineered function source may be configured to register the reusable code in the preloading block in a form corresponding to the IDL code of the stub code.

Here, generating the reengineered function source may be configured to change the non-reusable code into a form of the RPC server code and to register the changed non-reusable code in the RPC server code block.

Here, executing the reengineered function source may be configured to execute the reengineered function source, to execute RPC client code corresponding to the RPC server code, and to thereby change the state of the apparatus to a state capable of responding to a request to execute a function.

Here, determining whether the user function source is capable of being reengineered may be configured to check the IDL code of the user function source and to register a general-purpose function execution engine when previously stored IDL code corresponding to the IDL code of the user function source is not present, and executing the reengineered function source may be configured to execute a function, execution of which is requested by a user, using the general-purpose function execution engine.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings. Repeated descriptions and descriptions of known functions and configurations which have been deemed to unnecessarily obscure the gist of the present invention will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Throughout this specification, the terms "comprises" and/or "comprising" and "includes" and/or "including" specify the presence of stated elements but do not preclude the presence or addition of one or more other elements unless otherwise specified.

Hereinafter, a preferred embodiment of the present invention will be described in detail with reference to the accompanying drawings.

Figure 1:
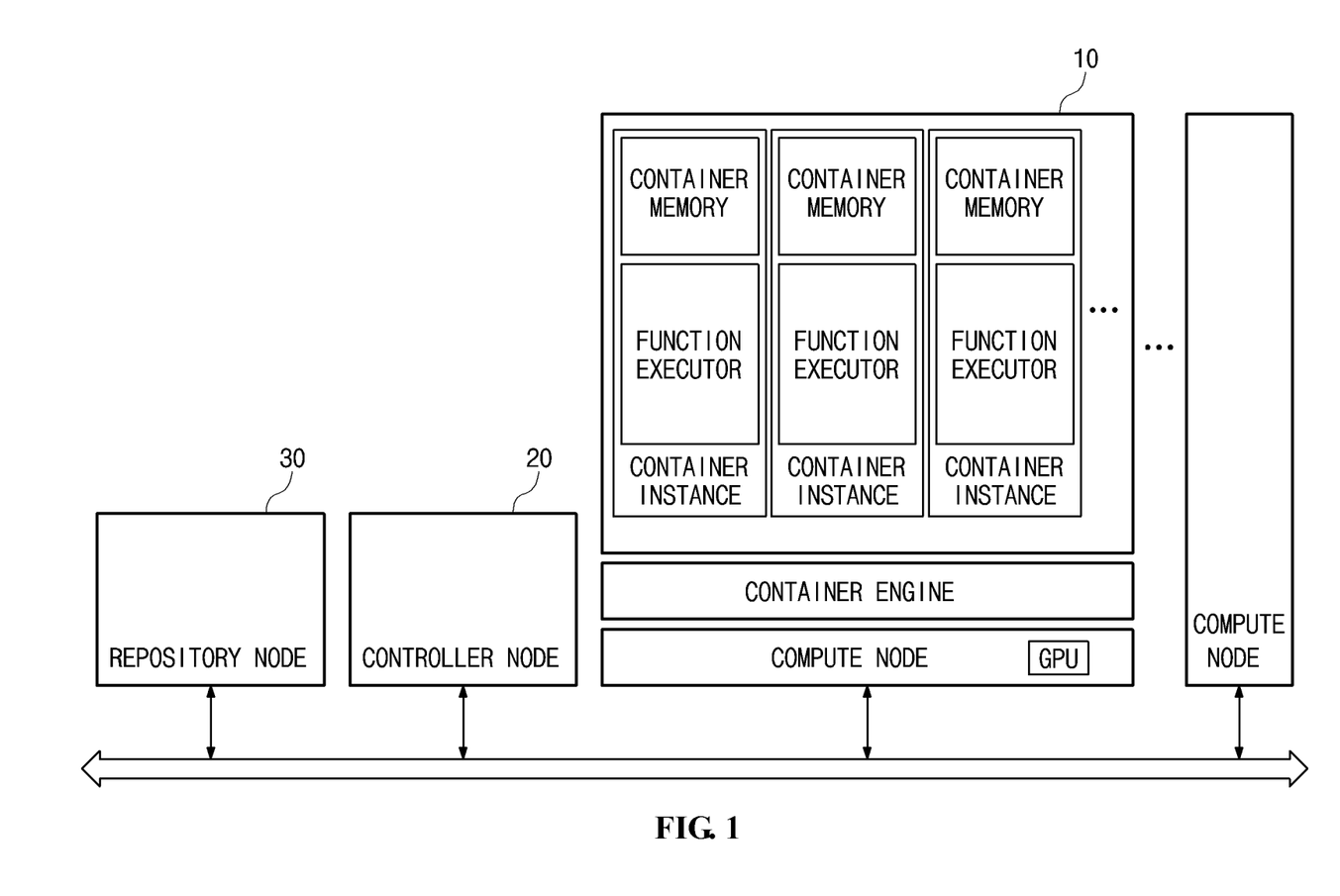
FIG. 1 is a block diagram that shows the configuration of hardware infrastructure according to an embodiment of the present invention.

FIG. 1 is a block diagram that shows the configuration of hardware infrastructure according to an embodiment of the present invention.

Referring to FIG. 1, an apparatus according to the present invention may operate on hardware infrastructure. Here, functions may be distributed across multiple nodes and be executed based on a high-speed network, and in this process, multiple copies of a function may be deployed across multiple nodes.

A computing node 10 may include a container engine, and a single function may operate on a function executor on a single container. Such a container may be provided through any of various technologies that have been developed, such as Docker, LXC, and the like, and the present invention is not dependent on any specific container.

A controller node 20 may be a node in which a function service for modifying and managing function sources is provided and in which a function gateway, a scheduler, and the like are executed. Depending on the system size, the controller node 20 may comprise multiple nodes.

A repository node 30 may store Interface Description Language (IDL) code for the language to be used, function sources of a user, and function sources reengineered therefrom. These sources may be accessed and used by the function service in the controller node 20.

Figure 2:
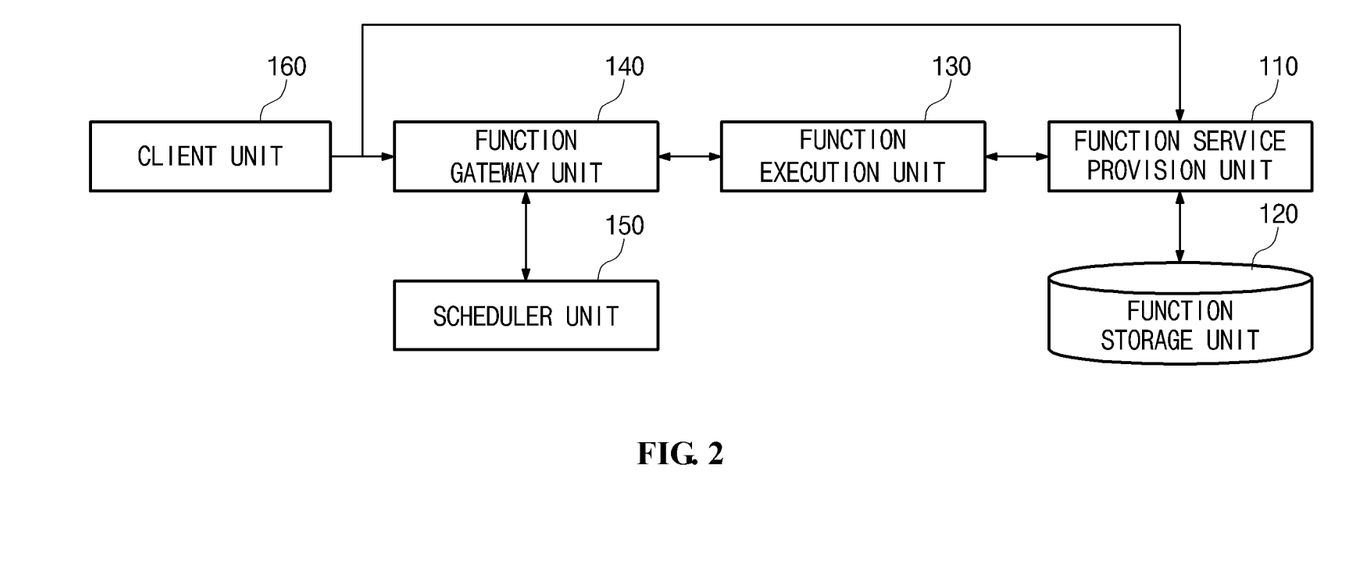
FIG. 2 is a block diagram that shows an apparatus for executing a function according to an embodiment of the present invention.
Figure 3:
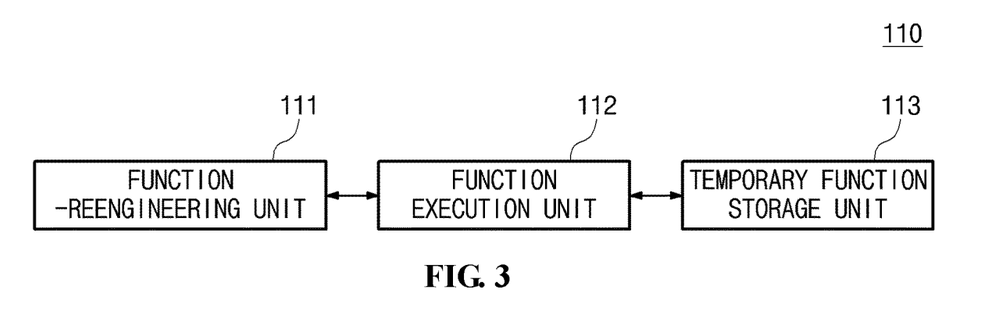
FIG. 3 is a block diagram that specifically shows an example of the function service provision unit illustrated in FIG. 2.
Figure 4:
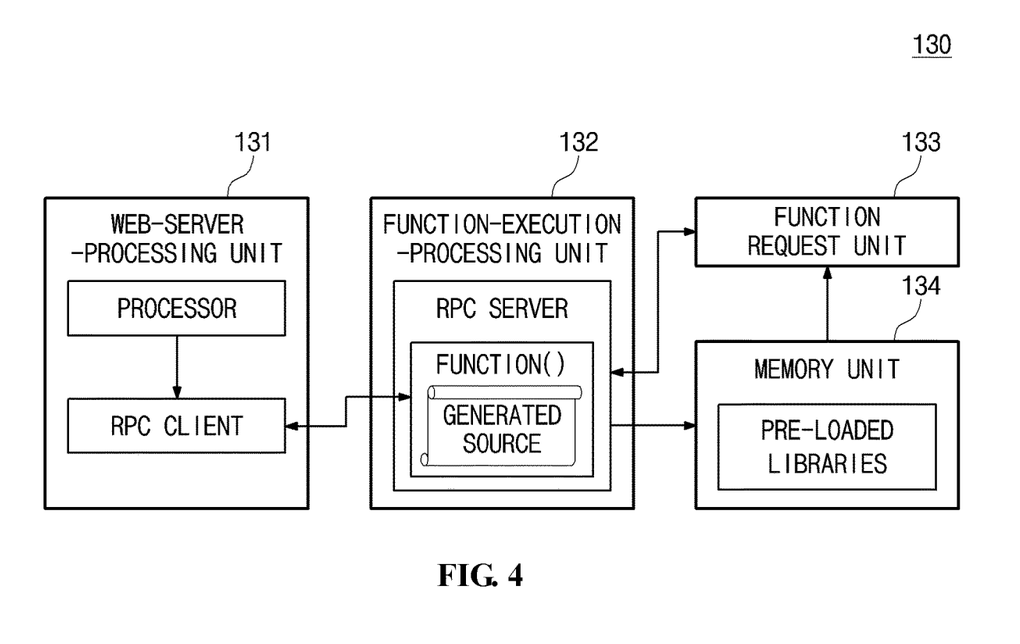
FIG. 4 is a block diagram that specifically shows an example of the function execution unit illustrated in FIG. 2.

FIG. 2 is a block diagram that shows an apparatus for executing a function according to an embodiment of the present invention. FIG. 3 is a block diagram that specifically shows an example of the function service provision unit illustrated in FIG. 2. FIG. 4 is a block diagram that specifically shows an example of the function execution unit illustrated in FIG. 2.

Referring to FIG. 2, the apparatus 100 for executing a function according to an embodiment of the present invention includes a function service provision unit 110, a function storage unit 120, a function execution unit 130, a function gateway unit 140, a scheduler unit 150, and a client unit 160.

The function service provision unit 110 may determine whether a user function source can be reengineered using IDL code and generate a reengineered function source by reengineering the user function source.

Here, the function service provision unit 110 may provide services such as registering a function, reengineering a function, caching a function, and the like.

Here, the function service provision unit 110 may include a function-reengineering unit 111, a function generation unit 112, and a temporary function storage unit 113.

The function-reengineering unit 111 may be a function-reengineering engine.

Here, the function-reengineering unit 111 may generate stub code using an IDL.

Here, the function-reengineering unit 111 may serve to analyze a user function source and combine the components thereof using IDL code so as to be suitable for an execution language.

Here, the function-reengineering unit 111 may check the IDL code of the user function source, and may determine that the user function source can be reengineered when previously stored IDL code, corresponding to the IDL code of the user function source, is present.

Here, the function-reengineering unit 111 may determine whether stub code is present in the IDL code of the user function source, and may generate stub code using a compiler corresponding to the IDL code of the user function source when it is determined that stub code is not present.

Here, the function-reengineering unit 111 may break down the user function source into reusable code, non-reusable code, and release code.

The function generation unit 112 may be a function source generator.

Here, the function generation unit 112 combines various function components generated by the function-reengineering unit 111, thereby finally generating a reengineered function source.

Here, the function generation unit 112 may store the reengineered function source in the function storage unit 120.

Here, the function generation unit 112 may change the user function source into a reengineered function source that includes a remote procedure call (RPC) server code block, a context source block, a preloading block, and a release code block.

Here, the function generation unit 112 may register RPC server code and context code in the RPC server code block and the context source block, respectively, in a form corresponding to the IDL code of the stub code.

Here, the function generation unit 112 may register the reusable code in the preloading block in the form corresponding to the IDL code of the stub code.

Here, the function generation unit 112 may change the non-reusable code into the form of RPC server code and register the same in the RPC server code block.

The temporary function storage unit 113 may be a function cache.

Here, the temporary function storage unit 113 may temporarily store the reengineered function source that was used once.

Here, the temporary function storage unit 113 may check a cache in response to a request for a function from the function execution unit 130 and return the function to the function execution unit 130.

Here, when the corresponding function is not present in the cache, a reengineered function source may be returned from the function storage unit 120, and the temporary function storage unit 113 may update the cache.

The function storage unit 120 may store IDLs for respective languages, user function sources, and reengineered function sources.

Here, the function storage unit 120 may store pieces of IDL code generated for respective languages.

The IDL code may be used for communication between an RPC server and an RPC client, and various Remote Procedure Call (RPC) techniques may be used therefor.

The user function source may be executable code of each user, which is written in any of various languages.

The reengineered function source may be user-executable code reengineered from the disaggregated components of the user function source.

The function execution unit 130 may execute a function source in response to a request to execute the function source, and may execute a reengineered function source.

Referring to FIG. 4, the function execution unit 130 may include a webserver-processing unit 131, a function-execution-processing unit 132, a function request unit 133, and a memory unit 134.

The webserver-processing unit 131 may include a webserver that is used in order to provide a Function-as-a-Service (FaaS) in the form of a REST API.

Here, a very small webserver, such as nodejs, python flask, or the like, may be used as the webserver.

The webserver-processing unit 131 may include a processor and an RPC client.

The processor may analyze a request to execute a function, transmitted from a user, and transmit the same to the RPC client.

The RPC client may invoke a specific RPC function, which is predefined for an RPC server and is included in the reengineered function source that is written in the same language as the webserver, and transmit the result of invocation thereof to the user.

The function-execution-processing unit 132 may be a function executor.

Here, the function-execution-processing unit 132 may be an instance for executing the reengineered function source in the form of RPC server code. The reengineered function source may be automatically generated in the RPC server source and executed.

Here, the function-execution-processing unit 132 executes the reengineered function source and executes RPC client code corresponding to the RPC server code, whereby the state thereof may be changed to a state in which it is possible to respond to a request to execute a function.

Here, the function-execution-processing unit 132 may check the IDL code of the user function source, register a general-purpose function execution engine when previously stored IDL code, corresponding to the IDL code of the user function source, is not present, and execute a function, the execution of which is requested by a user, using the general-purpose function execution engine.

The function request unit 133 may be a function loader.

The function request unit 133 may serve to request the function, the execution of which is requested by a user, from the function service and to prepare and execute a function executor in the container.

The memory unit 134 may be separate memory inside a single container, and the preloading block of a function executor may be loaded thereto.

The function gateway unit 140 may request a container, which is capable of executing a function, from a scheduler in response to a request from a user and transmit the request to the container when the container is prepared.

Here, when the function execution unit 130 completes the execution of a function source, the function gateway unit 140 may transmit the result of execution to the client unit 160.

The scheduler unit 150 may manage a container for the execution of a function, and may generate a function executor that is appropriate for a function in response to a request for the function.

Here, the scheduler unit 150 may return information about existing containers.

The client unit 160 may register a function in the function gateway unit 140 and request execution of the registered function.

Figure 5:
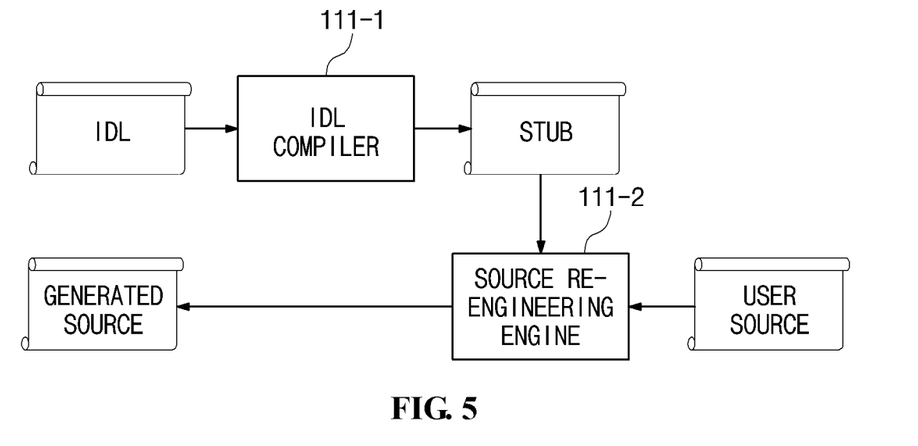
FIG. 5 is a view that shows the process of reengineering a function according to an embodiment of the present invention.

FIG. 5 is a view that shows the process of reengineering a function according to an embodiment of the present invention.

FIG. 5 illustrates the process of reengineering a single user-function source as an example of the process of reengineering a function according to an embodiment of the present invention.

For each language, an interface may be defined using IDL code.

Here, the IDL code may be used when an RPC client invokes a user function source in any of various languages. For a specific language, an IDL file may be defined in a very simple format.

According to an embodiment of the present invention, any of various RPC technologies, such as Apache thrift, Google gRPC, ZeroRPC, and the like, may be used in order to reengineer a function source. The type of webserver and supported languages may be determined depending on the RPC technology that is used, and a source-reengineering engine 111-2 may operate such that a user source is reengineered so as to have a structure appropriate for the RPC technology that is used.

In the process of reengineering a function according to an embodiment of the present invention, stub code for an RPC client and server may be generated using IDL code, which is appropriate for the technology and language that are used, and an IDL compiler 111-1 corresponding to the IDL code.

In the process of reengineering a function according to an embodiment, first, IDL code may be defined for respective RPC technologies. When gRPC is used, multiple languages, including Java, Python, Go, Ruby, and the like, may be supported. When Apache thrift is used, IDL code for each language may be defined.

Here, in the process of reengineering a function according to an embodiment of the present invention, the source-reengineering engine 111-2 may isolate optimizable statements and user logic from a user source and generate a reengineered function source using stub code.

Here, the IDL compiler 111-1 and the source-reengineering engine 111-2 may be included as the components of the function-reengineering unit 111 of the apparatus 100 for executing a function according to an embodiment of the present invention.

Figure 6:
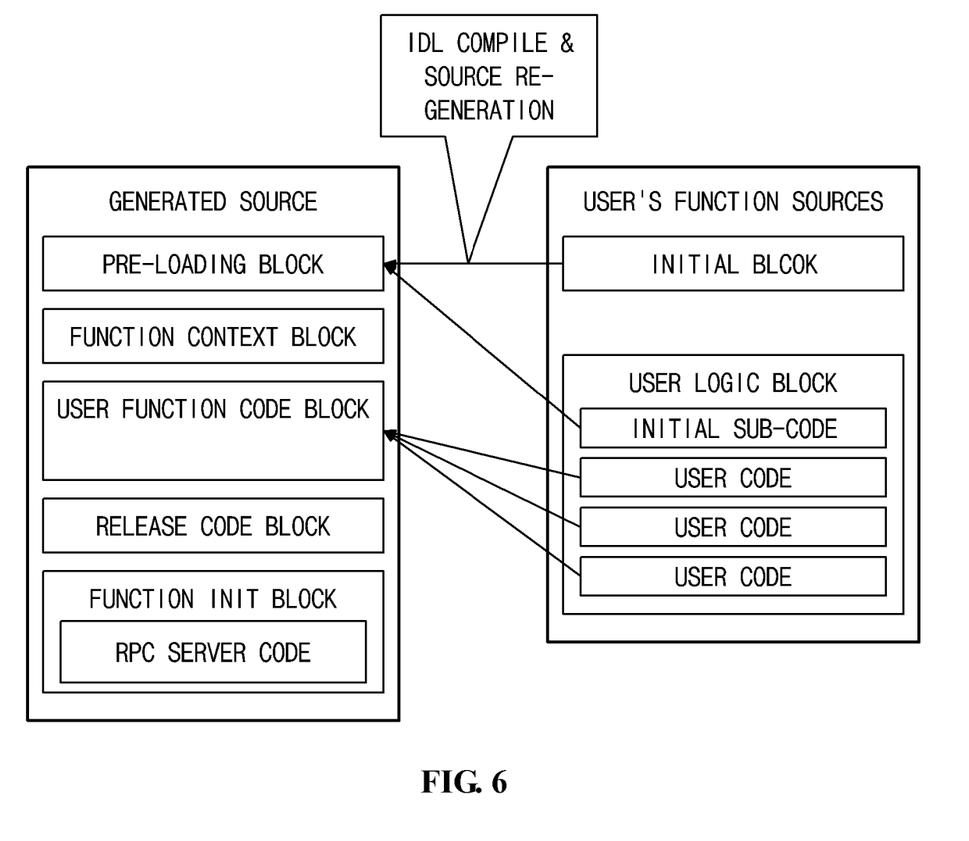
FIG. 6 is a view that shows the structure of a reengineered function source according to an embodiment of the present invention.

FIG. 6 is a view that shows the structure of a reengineered function source according to an embodiment of the present invention.

FIG. 6 shows the structure of a source when a function is reengineered. The blocks of reengineered code may include a preloading block, a function context block, a user function code block, a release code block, and a function initialization block.

The preloading block is space in which reusable code, included in the user source code, is to be placed. The preloading block may be executed when an RPC server is run in response to the execution of a container.

The function context block may provide a context for each function in a FaaS, and may include multiple functions, such as the transmission of a result, the transmission of a log, and the like, for the efficient use of a FaaS system.

The user function code block may include core logic that is not executed again in the user source.

Here, the user function code block may be registered as a function of the RPC server. Accordingly, when an RPC client invokes the function, the user function code block may be executed.

In the release code block, code that is reusable but needs to be reinitialized may be registered. Accordingly, libraries and the like may be initialized therein. An initialization statement for reuse may be generated depending on information about whether or not the library of each language is reused, which is specified by a source-reengineering engine.

The function initialization block is the block that is first executed when a container is executed, and may wait for a user request by running an RPC server after a preloading block is invoked.

Figure 7:
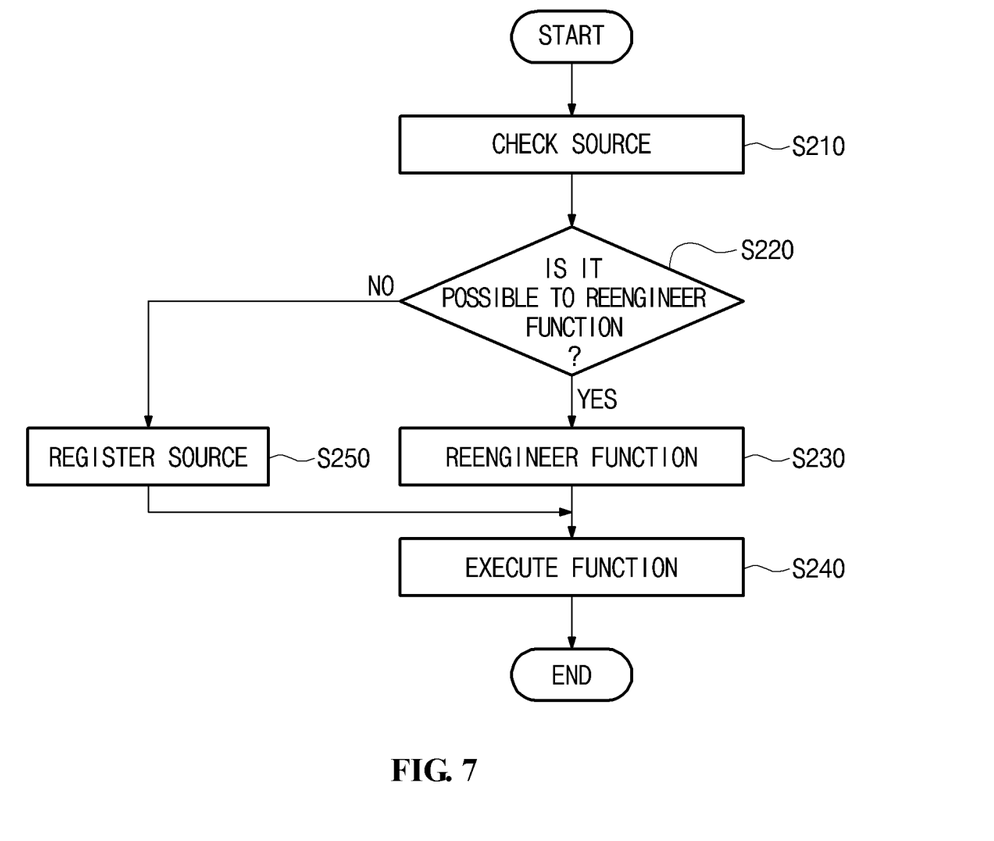
FIG. 7 is a flowchart that shows a method for executing a function according to an embodiment of the present invention.
Figure 8:
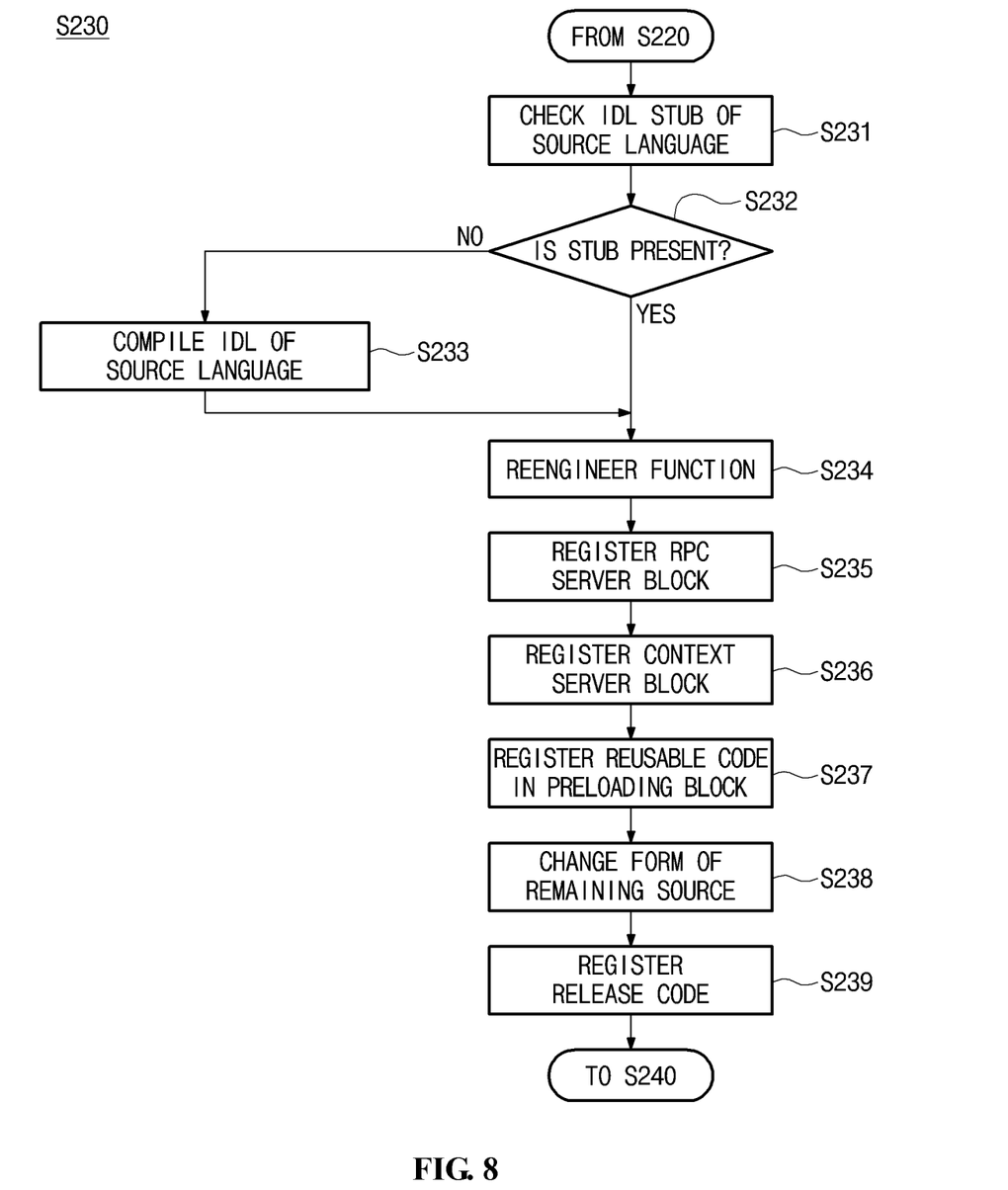
FIG. 8 is a flowchart that specifically shows an example of the function-reengineering step illustrated in FIG. 7.

FIG. 7 is a flowchart that shows a method for executing a function according to an embodiment of the present invention. FIG. 8 is a flowchart that specifically shows an example of the step of reengineering a function illustrated in FIG. 7.

Referring to FIG. 7, in the method for executing a function according to an embodiment of the present invention, first, whether a user function source can be reengineered may be checked at step S210.

That is, at step S210, when a user function source is registered, a function service checks pieces of IDL code, which are previously stored pieces of information, thereby determining whether the user function source can be reengineered.

Here, at step S210, whether the user function source can be reengineered may be determined using the IDL code.

Here, at step S210, the IDL code of the user function source is checked, and it may be determined that the user function source can be reengineered when previously stored IDL code corresponding to the IDL code of the user function source is present.

Here, at step S210, it may be determined whether stub code is present in the IDL code of the user function source.

Here, whether the user function source can be reengineered may be determined at step S220 based on previously stored IDL specifications and on whether IDL code for the language of the user function source is registered.

Also, when it is determined at step S220 that the user function source can be reengineered, the user function source may be reengineered at step S230, but when it is determined that the user function source cannot be reengineered, the user function source may be registered at step S250.

That is, at step S230, the user function source may be reengineered.

Here, at step S230, the user function source is reengineered, whereby a reengineered function source may be generated.

Referring to FIG. 8, at step S230, first, the IDL stub of the user function source may be checked at step S231.

That is, at step S231, because it is determined that the user function source can be reengineered for a corresponding language, whether IDL stub code in the corresponding language is present may be checked.

Here, when it is determined that IDL stub code is not present, IDL code is compiled to the language of the user function source at step S233. Conversely, when it is determined that IDL stub code is present, a function-reengineering process may be performed at step S234.

That is, at step S233, whether or not to compile the IDL code may be determined depending on whether stub code in the corresponding language is present.

Here, at step S233, when there is no IDL stub code for the corresponding language, IDL stub code may be generated using an IDL compiler pertaining to the RPC technology that is being used.

Also, at step S234, the user function source is broken down, whereby reusable code, non-reusable code, and release code for the used code may be generated.

Here, at step S234, the user function source may be reengineered using the IDL stub code.

Here, at step S234, the user function source may be changed into the reengineered function source that includes an RPC server code block, a context source block, a preloading block, and a release code block.

Also, at step S235, an RPC server code block may be generated as a block of the reengineered function source.

Here, at step S235, RPC server code may be registered in the RPC server code block in a form corresponding to the IDL code of the stub code.

Also, at step S236, a context source block may be generated as a block of the reengineered function source.

Here, at step S236, context code may be registered in the context source block in a form corresponding to the IDL code of the stub code.

Also, at step S237, pieces of reusable code included in the user function source may be registered in the preloading block.

Also, at step S237, the reusable code may be registered in the preloading block in a form corresponding to the IDL code of the stub code.

Also, at step S238, non-reusable code may be registered in the form of a function of the RPC server.

Here, at step S238, the user code may be changed into a form into which the reusable code is changed.

Here, at step S238, the non-reusable code may be changed into the RPC server code and may be registered in the RPC server code block.

Also, at step S239, the release code block may be registered.

Also, in the method for executing a function according to an embodiment of the present invention, the reengineered function source may be executed at step S240.

That is, at step S240, the reengineered function source is executed, and the RPC client code corresponding to the RPC server code is executed, whereby readiness to respond to a request to execute a function may be realized.

Here, at step S240, a reengineered function source is generated, and the code of the reengineered function source may be executed.

Here, at step S240, because the RPC server code is registered in the code of the reengineered function source, the RPC server code is ready to be executed, and the RPC client runs a registered webserver, whereby it is ready to respond to a request from a user to execute a function.

Also, at step S250, the user function source may be registered in a general-purpose function execution engine.

That is, after the IDL code of the user function source is checked, when previously stored IDL code corresponding thereto is not present, a general-purpose function execution engine is registered at step S250, and the function, the execution of which is requested by a user, may be executed using the general-purpose function execution engine at step S240.

For example, when IDL code for the corresponding language is not present, it is impossible to reengineer the user function source. Accordingly, service for the corresponding function may be provided at step S250 using a general-purpose FaaS execution engine, such as Microcule.

Figure 9:
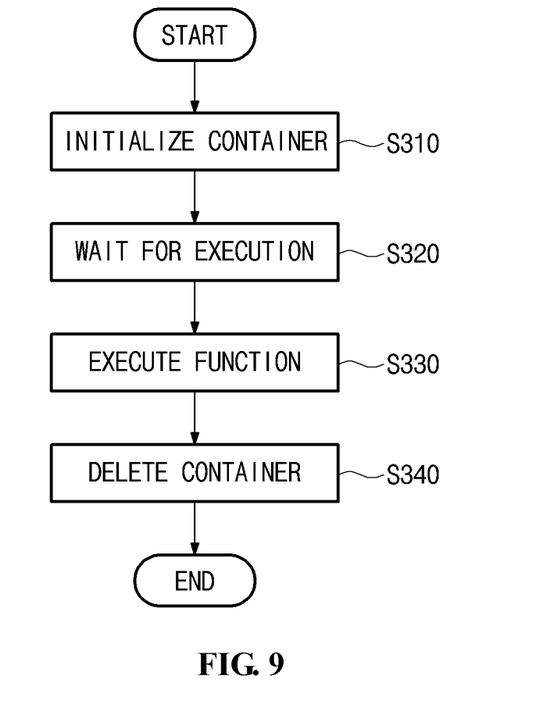
FIG. 9 is a flowchart that shows a method for executing a function in a container generated based on a scheduler algorithm according to an embodiment of the present invention.

FIG. 9 is a flowchart that shows a method for executing a function in a container generated based on a scheduler algorithm according to an embodiment of the present invention.

Referring to FIG. 9, in the method for executing a function in a container generated based on a scheduler algorithm according to an embodiment of the present invention, first, a container may be initialized at step S310.

That is, at step S310, the state of a function executor on the container generated based on a scheduler algorithm may be initialized.

Here, at step S310, in response to a request from a user or depending on a determination by a scheduler, a specific reengineered user source may be requested to be loaded into the container.

Here, at step S310, a relevant node may initialize the container so as to be suitable for the source. Here, the container is an environment in which a function is to be executed.

In the method for executing a function in a container generated based on a scheduler algorithm according to an embodiment of the present invention, the state of the function executor may be changed to an execution-waiting state at step S320.

That is, at step S320, when initialization at step S310 is completed, the reengineered function source of the corresponding function may be requested from the function service. When the reengineered function source is received, the code of the reengineered function source may be executed.

Here, at step S320, a webserver including an RPC client may be run in order to process a request to execute the function from a user.

Here, at step S320, when the above processes are completed, the state of the function executor may be changed from the initialized state to the execution-waiting state.

Also, in the method for executing a function in a container generated based on a scheduler algorithm according to an embodiment of the present invention, the function may be executed at step S330.

That is, at step S330, when a request to execute the function is received from a user in the execution-waiting state, the webserver inside the function executor interprets the request from the user and executes the function of the RPC server through the RPC client.

Here, at step S330, the function executor may maintain the function execution state while the function is being executed.

Here, at step S330, the state of the function executor may be changed from the function execution state to the execution-waiting state.

Here, at step S330, when the execution of the function is completed, the result of function execution is transmitted to the user, and the release block is executed, whereby the previous state may be cleared.

Here, at step S330, when the above processes are completed, the function executor is changed to the execution-waiting state, in which another request may be processed.

Also, in the method for executing a function in a container generated by a scheduler algorithm according to an embodiment of the present invention, the container may be deleted at step S340.

That is, at step S340, when a request is not received from a user for a certain time period, the scheduler may delete the container including the function.

Figure 10:
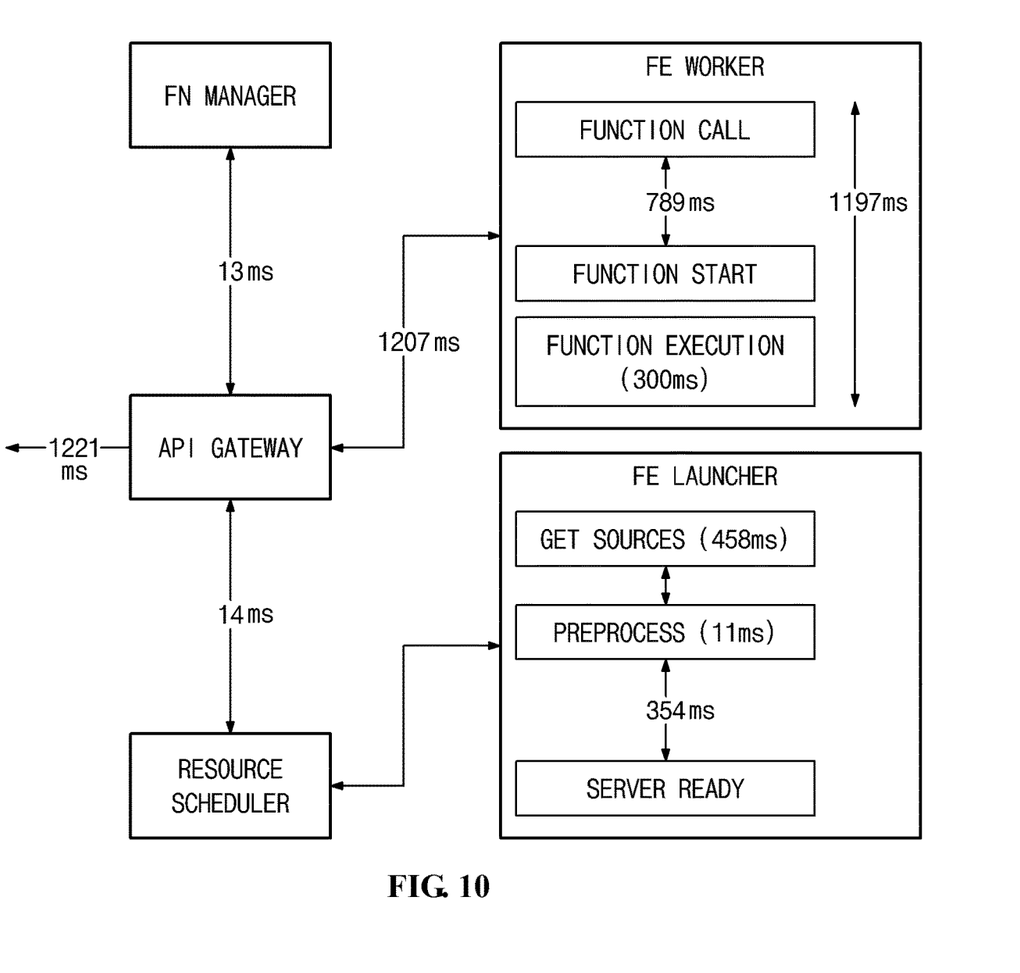
FIG. 10 is a view that shows an execution process and an execution time in a conventional system.
Figure 11:
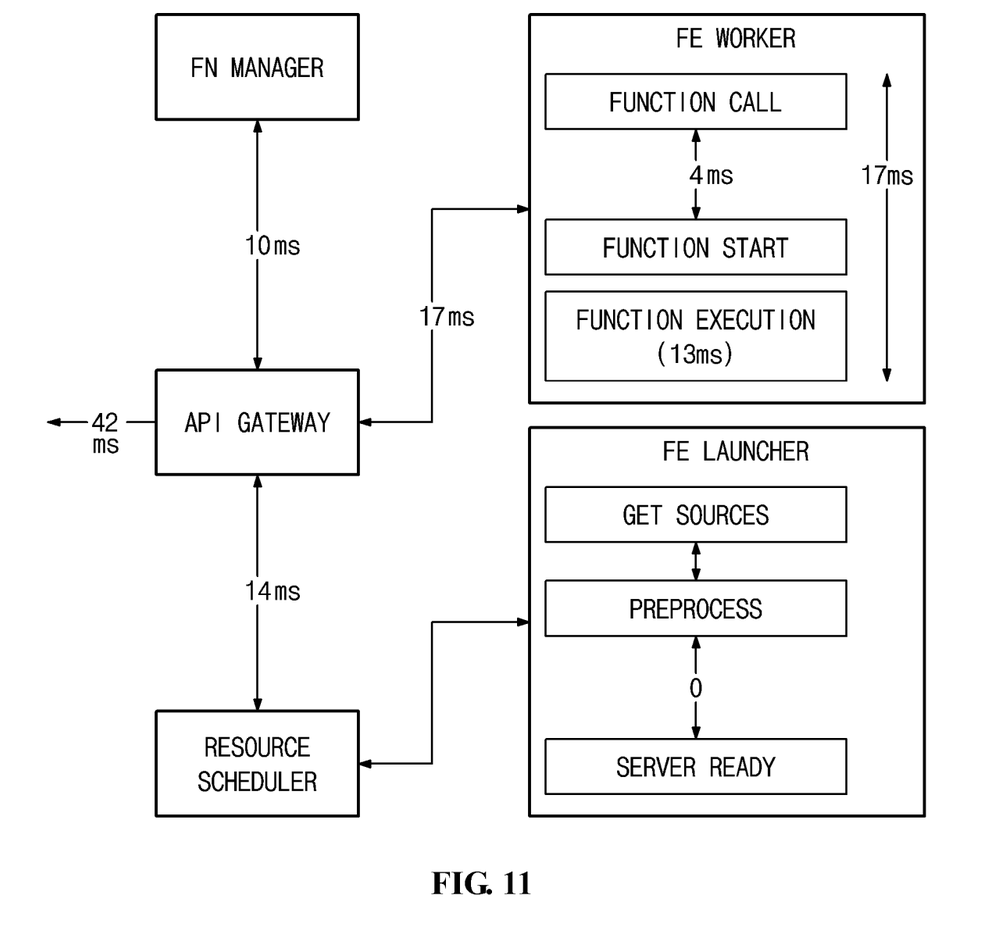
FIG. 11 is a view that shows an execution process and an execution time in a system according to an embodiment of the present invention.

FIG. 10 is a view that shows an execution process and an execution time in a conventional system. FIG. 11 is a view that shows an execution process and an execution time in a system according to an embodiment of the present invention.

The apparatus and method for executing a function according to an embodiment of the present invention optimize a user function in a FaaS platform, thereby quickly providing service.

In the present invention, PoC is implemented for a TensorFlow inference source based on Python, and it may be confirmed that the time taken to execute a single function is reduced, as shown in FIG. 10 and FIG. 11. The PoC environment of the present invention is as shown in the following Table 1.

TABLE 1

| environment | note |
| --- | --- |
| OS | Linux 16.04 |
| container | docker container engine |
| language | python 3 |
| RPC | ZeroRPC(IPC) |
| webserver | nodejs, express web framework |
| executable source | TensorFlow inference (CPU version) |

Referring to FIG. 10, the time consumed for each execution process when a function is executed using Microcule, which is an execution engine commonly used in an existing FaaS system, is illustrated in units of milliseconds.

Referring to FIG. 11, the time consumed for each execution process when a function is executed by applying the apparatus and method for executing a function according to an embodiment of the present invention to the FaaS system is illustrated in units of milliseconds.

Table 2 shows changes in the total function execution time, the function execution preparation time, the container operation time, and the function execution time when the existing FaaS system in FIG. 10 is compared with the FaaS system in which the apparatus and method for executing a function according to an embodiment of the present invention are applied.

TABLE 2

| Details | change in consumed time |
| --- | --- |
| total function execution time | 1221 ms → 42 ms |
| function execution preparation time | 789 ms → 4 ms |
| container operation time | 1207 ms → 17 ms |
| function execution time | 300 ms → 13 ms |

Figure 12:
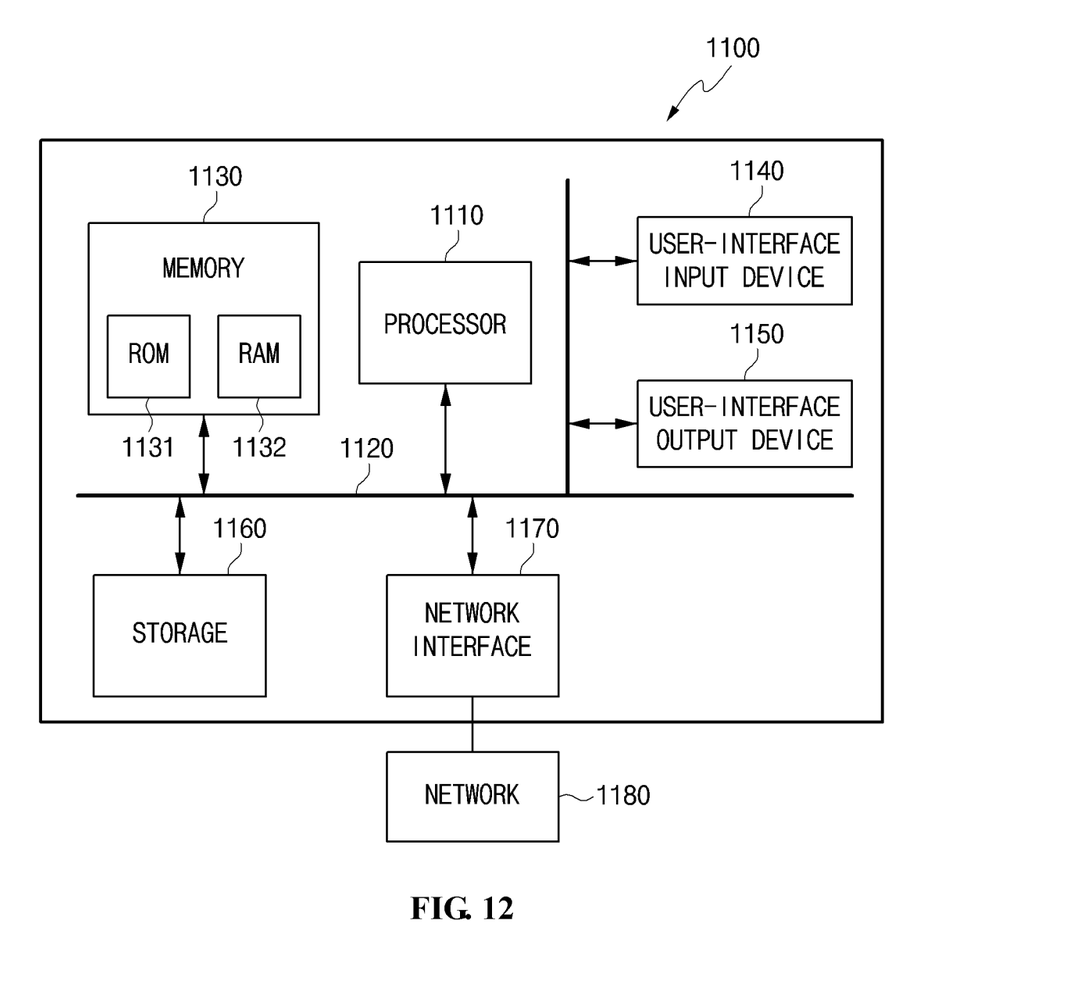
FIG. 12 is a view that shows a computer system according to an embodiment of the present invention.

FIG. 12 is a view that shows a computer system according to an embodiment of the present invention.

Referring to FIG. 12, the apparatus 100 for executing a function according to an embodiment of the present invention may be implemented in a computer system 1100 including a computer-readable recording medium. As shown in FIG. 12, the computer system 1100 may include one or more processors 1110, memory 1130, a user-interface input device 1140, a user-interface output device 1150, and storage 1160, which communicate with each other via a bus 1120. Also, the computer system 1100 may further include a network interface 1170 connected to a network 1180. The processor 1110 may be a central processing unit or a semiconductor device for executing processing instructions stored in the memory 1130 or the storage 1160. The memory 1130 and the storage 1160 may be any of various types of volatile or nonvolatile storage media. For example, the memory may include ROM 1131 or RAM 1132.

That is, the apparatus 100 for executing a function according to an embodiment of the present invention may include the one or more processors 1110 and the executable memory 1130 for storing at least one program executed by the one or more processors 1110.

Here, the one or more processors 1110 may correspond to the function service provision unit 110, the function execution unit 130, the function gateway unit 140, the scheduler unit 150, and the client unit 160, which are the components of the apparatus 100 for executing the function described with reference to FIG. 2, and the storage 1160 may be the function storage unit 120 controlled by the one or more processors 1110.

Here, the at least one program determines whether a user function source can be reengineered using IDL code, generates a reengineered function source by reengineering the user function source, and executes the reengineered function source.

Here, the at least one program may check the IDL code of the user function source, and may determine that the user function source can be reengineered when previously stored IDL code corresponding to the IDL code of the user function source is present.

Here, the at least one program may check whether stub code is present in the IDL code of the user function source, and may generate stub code using a compiler corresponding to the IDL code of the user function source when there is no stub code.

Here, the at least one program may break down the user function source into reusable code, non-reusable code, and release code.

Here, the at least one program may change the user function source to the reengineered function source including an RPC server code block, a context source block, a preloading block, and a release code block.

Here, the at least one program may register RPC server code and context code in the RPC server code block and the context source block, respectively, in a form corresponding to the IDL code of the stub code.

Here, the at least one program may register the reusable code in the preloading block in a form corresponding to the IDL code of the stub code.

Here, the at least one program may change the non-reusable code to the form of the RPC server code and register the same in the RPC server code block.

Here, the at least one program may execute the reengineered function source and RPC client code corresponding to the RPC server code, thereby changing the state of the apparatus to a state in which it is possible to respond to a request to execute a function.

Here, the at least one program may check the IDL code of the user function source. When there is no previously stored IDL code corresponding to the IDL code of the user function source, the at least one program may register a general-purpose function execution engine and execute the function, the execution of which is requested by a user, using the general-purpose function execution engine.

The present invention may quickly provide a service by optimizing a user function in a service platform.

Also, the present invention may efficiently reduce a delay in function execution, which is a problem with an existing function executor.

As described above, the apparatus and method for executing a function according to the present invention are not limitedly applied to the configurations and operations of the above-described embodiments, but all or some of the embodiments may be selectively combined and configured, so that the embodiments may be modified in various ways.

What is claimed is:

1. An apparatus for executing a function, comprising:
one or more processors; and
executable memory for storing at least one program executed by the one or more processors,
wherein the at least one program determines whether a user function source is capable of being reengineered using Interface Description Language (IDL) code, generates a reengineered function source by reengineering the user function source, and executes the reengineered function source,
wherein the at least one program checks IDL code of the user function source and determines that the user function source is capable of being reengineered when previously stored IDL code corresponding to the IDL code of the user function source is present,
wherein the at least one program breaks down the user function source into reusable code, non-reusable code, and release code,
wherein the at least one program changes the user function source into the reengineered function source including a function initialization block which contains a remote procedure call (RPC) server code block, a context source block, a user function code block, a preloading block, and a release code block.

2. The apparatus of claim 1, wherein the at least one program determines whether stub code is present in the IDL code of the user function source and generates stub code using a compiler corresponding to the IDL code of the user function source when it is determined that the stub code is not present.

3. The apparatus of claim 1, wherein the at least one program registers RPC server code and context code in the RPC server code block and the context source block, respectively, in a form corresponding to IDL code of the stub code.

4. The apparatus of claim 3, wherein the at least one program registers the reusable code in the preloading block in a form corresponding to the IDL code of the stub code.

5. The apparatus of claim 4, wherein the at least one program changes the non-reusable code into a form of the RPC server code and registers the changed non-reusable code in the RPC server code block.

6. The apparatus of claim 5, wherein the at least one program executes the reengineered function source and executes RPC client code corresponding to the RPC server code, thereby changing a state of the apparatus to a state capable of responding to a request to execute a function.

7. The apparatus of claim 1, wherein the at least one program checks IDL code of the user function source, registers a general-purpose function execution engine when previously stored IDL code corresponding to the IDL code of the user function source is not present, and executes a function, execution of which is requested by a user, using the general-purpose function execution engine.

8. A method for executing a function, performed by an apparatus for executing the function, comprising:
determining whether a user function source is capable of being reengineered using Interface Description Language (IDL) code;
generating a reengineered function source by reengineering the user function source; and
executing the reengineered function source,
wherein determining whether the user function source is capable of being reengineered is configured to check IDL code of the user function source and to determine that the user function source is capable of being reengineered when previously stored IDL code corresponding to the IDL code of the user function source is present,
wherein generating the reengineered function source is configured to break down the user function source into reusable code, non-reusable code, and release code,
wherein generating the reengineered function source is configured to change the user function source into the reengineered function source including a function initialization block which contains a remote procedure call (RPC) server code block, a context source block, a, user function code block, a preloading block, and a release code block.

9. The method of claim 8, wherein determining whether the user function source is capable of being reengineered is configured to determine whether stub code is present in the IDL code of the user function source and to generate stub code using a compiler corresponding to the IDL code of the user function source when it is determined that the stub code is not present.

10. The method of claim 8, wherein generating the reengineered function source is configured to register RPC server code and context code in the RPC server code block and the context source block, respectively, in a form corresponding to IDL code of the stub code.

11. The method of claim 10, wherein generating the reengineered function source is configured to register the reusable code in the preloading block in a form corresponding to the IDL code of the stub code.

12. The method of claim 11, wherein generating the reengineered function source is configured to change the non-reusable code into a form of the RPC server code and to register the changed non-reusable code in the RPC server code block.

13. The method of claim 12, wherein executing the reengineered function source is configured to execute the reengineered function source, to execute RPC client code corresponding to the RPC server code, and to thereby change a state of the apparatus to a state capable of responding to a request to execute a function.

14. The method of claim 8, wherein:
determining whether the user function source is capable of being reengineered is configured to check IDL code of the user function source and to register a general-purpose function execution engine when previously stored IDL code corresponding to the IDL code of the user function source is not present; and
executing the reengineered function source is configured to execute a function, execution of which is requested by a user, using the general-purpose function execution engine.

* * * * *